May 24, 1960     E. D. STIRLEN     2,937,506
COOLING SYSTEM Filed Feb. 7, 1956     2 Sheets-Sheet 1

INVENTOR.
EUGENE D. STIRLEN
BY Edward W. Eames
ATTORNEY

May 24, 1960 E. D. STIRLEN 2,937,506
COOLING SYSTEM
Filed Feb. 7, 1956 2 Sheets-Sheet 2

INVENTOR.
EUGENE D. STIRLEN
BY Edward H. Eames
ATTORNEY

United States Patent Office 2,937,506
Patented May 24, 1960

2,937,506

COOLING SYSTEM

Eugene D. Stirlen, New Haven, Conn., assignor to Eastern Industries, Incorporated, East Norwalk, Conn., a corporation of Delaware Filed Feb. 7, 1956, Ser. No. 563,905

19 Claims. (Cl. 62—121)

This invention relates to one aspect of a cooling system, particularly adapted for aircraft, target-seeking missiles, self-propelled or remote controlled missiles or vehicles or the like carrying electronic equipment or other heat generating devices or in other circumstances where it is necessary to dispose of heat outside such aircraft, missile or other vehicle at relatively high ambient temperature levels or with low density surrounding air, and to prevent the temperature within some part or substantially all of such craft from exceeding a relatively low value. From this aspect the invention has particular application and marked advantage in connection with high altitude airborne or rocket-propelled craft where compactness and minimum weight are very important and sometimes critical factors.

For convenience of reference the term "craft" is used in this specification to include aircraft, airborne missiles, rockets or vehicles in the broad sense, but without limitation thereto. Also the term "airborne" is used in the broad sense of traveling through the air or atmosphere or in the rarefied conditions outside the lower atmosphere, and includes support by jet or reaction power as well as other forms of motive or supporting power without limitation to support by air itself.

From another aspect the invention relates to a heat sink or heat disposal device of a very compact and efficient type, which may serve as a very effective component of a cooling system of the above general type, but may have much broader and more general applications, and which extracts heat at a relatively low controlled temperature (as for example below the normal boiling point of water for normal sea level atmospheric pressure) and is able to dispose of such heat in the presence of much higher ambient temperatures.

From a further aspect the invention relates to a greatly improved method of extracting heat at or below a desired controlled temperature.

This invention more particularly relates to a cooling system or method for extracting heat at a relatively low or moderate initial temperature by employing an enclosed liquid-vapor compression-expansion refrigeration cycle for extraction of such heat, and by employing controlled evaporation of a liquid in heat exchange relation with the first liquid at the output end of such cycle at a relatively small increase in temperature over such initial temperature to enable such cycle to operate at a high coefficient of performance.

This invntion, from another aspect, relates to a cooling system for or in connection with airborne craft to maintain some part of such craft below a desired moderate initial temperature, where such craft is subject over a period of time to a wide range of surrounding conditions such as normal atmospheric pressures and temperatures near sea level at on time and reduced pressures and density as well as elevated temperatures of ram air or any surrounding medium which may be inducted into the craft at high altitudes or in high speed flight at great distances from the surface of the earth at another time, for example.

The invention from a general aspect relates to an improved sysetm or method of extracting heat by controlled vaporization of a liquid by introducing an inert gas into the liquid-vapor equilibrium whereby the partial pressure of the vapor is reduced, and the evaporation temperature is reduced to a temperature below the normal evaporation temperature of the liquid-vapor equilibrium.

This invention also more particularly relates to a system or method or extracting heat from a heat generating source by employing a liquid medium taking heat from such source and by bubbling a gas through such liquid medium or otherwise introducing a gas in or adjacent the liquid-vapor surface of such liquid and its vapor to obtain a controlled evaporation effect comparable to boiling the liquid at a sub-normal temperature in relation to the total ambient pressure and thus to employ the heat of vaporization of the liquid to carry off the heat.

In the preferred form the invention employs water as the liquid medium because of its high heat of vaporization and low cost and general availability, and obtains effective evaporation of the water at a controlled temperature much below its normal boiling point at the ambient total pressure, by introducing air in finely divided bubbles through the water to vaporize the water at a controlled rate and carry off the heat as low temperature steam or vapor considerably below its normal boiling point.

In high velocity aircraft or missiles, the friction of the air raises the temperature along the outer surface, both the surface of the housing of the craft and to a large degree the air in immediate contact with such surface. Such temperature may rise to 400° Fahrenheit or more for example. Ram air brought in from outside the craft for direct cooling is immediately raised to an elevated temperature also, so that it is of no value for lower temperature cooling purposes. Likewise at altitudes where air is of very low density its heat absorbing power is greatly reduced, so that it is not effective as a cooling agent.

In such aircraft, missiles and other airborne craft there are various elecrtical, electronic, and sometimes hydraulic components which are giving off heat. If this heat is not removed and disposed of, the components will soon overheat and be damaged or rendered ineffective. Sometimes various componets must be kept at controlled temperatures which at high velocity flight are ordinarily much below the immediately surrounding ambient temperatures, and most of such components must be kept at subcritical temperatures to permit them to continue operation effectively.

This presents a problem of absorbing heat at a lower temperature level and of disposing of such heat under variable ambient conditions, but particularly when such equipment is being operated under conditions where the immediately surrounding ambient temperature is above the safe or critical temperature of the components, and of doing this under conditions where air alone can no longer be used effectively, if at all, as a heat sink.

If motors or other power driven components are utilized in extracting and disposing of this heat, these motors and power driven components will also generate heat which must be disposed of in part or wholly through the means being used to cool the other components for which the system is being used.

It is therefore a general object of the invention to provide a means or method of using the heat of vaporization of a liquid such as water for example as a heat sink, and to permit the utilization of this heat sink at controlled temperatures below the normal boiling temperature of such liquid at the normal atmospheric pressure at low altitudes, as for example considerably below the 212° F. normal boiling temperature for water.

It is another object of the invention to provide a means or method of introducing a relatively inert gas such as air for example into a combination of liquid and its vapor, such as water and water-vapor for example, to enable vaporization of such liquid at a temperature considerably below its normal boiling point at the ambient atmospheric pressure and to exhaust such gas and vapor to provide a heat sink at a controlled temperature, where the gas added may be at a lower or higher temperature than said controlled temperature.

It is a further object of the invention to utilize a heat sink of this general type in conjunction with a liquid-vapor refrigeration cycle to lower the condenser temperature in locations where ambient temperature is high or in locations where ambient air density is too low for air cooling, and by this means to obtain a higher coefficient of performance from the liquid-vapor refrigeration cycle than would be otherwise possible.

It is also an object of the invention to provide a cooling system for conditions of high ambient temperatures or reduced air density or both, including a liquid-vapor refrigeration cycle operating at an increased coefficient of performance in conjunction with a heat sink operating at a higher temperature than that at which it is desired to extract heat from heat generating sources, and including provision for cooling the condenser, motors, and compressor used in conjunction with such cooling system.

It is a further object of the invention to provide in a cooling system for airborne craft subject to wide variations in atmospheric density, temperature and pressure accompanying flight between low and very high altitudes and including conditions of air at too high temperature or too low density or both for direct cooling means for extracting and disposing of heat by controlled vaporization of a liquid.

It is an additional object of the invention to provide a heat sink of any of the aforesaid types which is designed to operate at any of the attitudes in three dimensions and the various conditions of velocity and acceleration which may be experienced in aircraft, missiles, or other airborne craft.

Other objects will appear from the following description and claims.

In a liquid-vapor cycle refrigerator the coefficient of performance is a function of the absolute temperature of the cold coil (evaporator) and the warm coil (condenser). The closer these two temperatures, the greater the coefficient of performance. The further these two temperatures are apart, the lower the coefficient of performance. The coefficient of performance is the amount of heat transferred from the cold end to the hot end, divided by the heat equivalent of the work required to cause the transfer to take place.

It is extremely important in airborne equipment that the coefficient of performance be kept high in order to reduce weight and power drain, and yet that this be done under conditions which would normally result in a very low coefficient of performance. A low coefficient of performance also increases the difficulty of getting rid of the heat, because the system must not only get rid of the original heat in the problem but must also get rid of all of the heat introduced as work in the mechanism which is utilized to dispose of the original heat. For example, if the original problem is to dispose of 1,000 B.t.u. per hour, and a device having a low coefficient of performance of 1:1 were to be used in extracting this heat, there would then be a problem of disposing of a total of 2,000 B.t.u. per hour at the output end of such device.

Although the exact amount varies with temperature, water will absorb approximately 1,000 B.t.u. per pound in changing from liquid to vapor. However under sea level conditions the boiling point of water is 212° Fahrenheit (212° F.), where the atmospheric pressure is 760 millimeters of mercury (760 mm.). At altitude the boiling point will be lower—according to the barometric pressure. If the boiling point could be reduced under sea level conditions to a controlled lower temperature, or if rapid evaporation on a controlled basis could be obtained at this lower temperature at sea level and likewise controlled to this lower temperature at altitude, one would have a heat sink to cool the coils of a liquid-vapor refrigerator, to give an improved coefficient of performance, and to also cool motors and other power driven components used in the refrigerating system, when operating in surroundings of much higher ambient temperature or in conditions of low air density.

To attempt to accomplish the controlled evaporation at sub-normal boiling temperature by producing reduced pressure by vacuum pump or other evacuating means, would be very cumbersome in size and weight and inefficient for airborne craft with known methods.

In an ambient pressure of 760 mm. of mercury, water boils at 212° F. and the water vapor pressure is equal to the total pressure of 760 mm. However, if an inert gas such as air is introduced into the liquid-water vapor equilibrium, although the total pressure would remain at 760 mm., it can be seen that the partial pressure of the water vapor in the equilibrium would be reduced and that controlled evaporation would be obtained at the reduced equilibrium temperature corresponding to the partial pressure of the water vapor.

This feature is employed in accordance with the invention to obtain controlled evaporation for the extraction of heat at controlled temperatures over a wide range of ambient conditions which may include ambient temperatures considerably higher than such controlled temperatures, or absence of sufficient density of air or other surrounding medium to conduct away the heat directly.

Referring now to the drawings.

Figure 1:
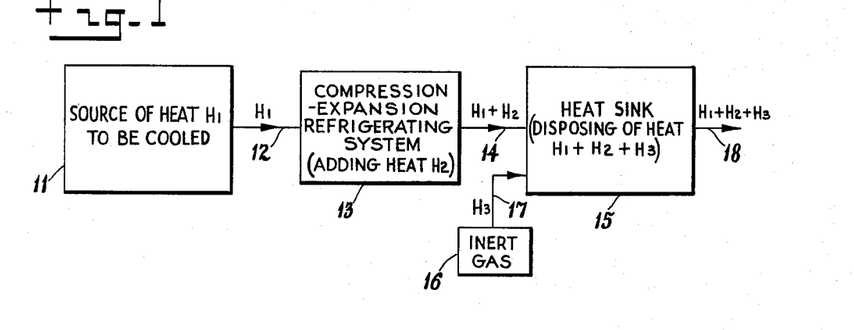
Fig. 1 illustrates in block diagram form a cooling system according to one aspect of the invention.

Referring now to Fig. 1, a cooling system or method according to one aspect of the invention is illustrated in block diagram form, the block 11 representing the original or initial source of heat H1, to be cooled or extracted, the block 13 representing a compression-expansion refrigerating system or cycle for extracting heat H1, and the block 15 representing the heat sink for disposing of the total heat by controlled liquid evaporation. The small block 16 represents the inert gas, such as air in the preferred form, introduced into the heat sink to provide controlled evaporation at desired temperature for disposing of the heat.

The total heat disposed of includes the heat H1 from the initial source 11, plus the heat H2 added in the refrigerating cycle 13, plus the heat H3 added (if any) by the gas 16. Any further heat generated in the heat sink operation, in circulating pumps and blowers or in other components of the system, is also disposed of by the heat sink. Such further heat from friction or other losses in the system could be lumped together as heat H4 disposed of with $H1+H2+H3$ in the heat sink, but for purpose of simplicity in illustrating and describing the system such additional heat is not separately designated in Fig. 1 or separately evaluated.

The extraction and transfer and final disposal of heat are indicated in Fig. 1 by several arrows 12, 14, 17 and 18. Arrow 12 indicates the extraction and transfer of heat $H1$ from the source 11 to the refrigerating system 13, arrow 14 indicates the transfer of heat $H1$ plus the heat $H2$ added by the refrigerating system, from the latter to the heat sink 15, and arrow 18 indicates the disposal of the heat $H1$ plus $H2$ plus $H3$. The arrow 17 indicates the heat $H3$ added by the gas 16, such addition being in the algebraic sense. Thus heat $H3$ is a positive addition if the temperature of the gas 16 is above that of the liquid in the heat sink, and is a negative addition, or in effect a subtraction, if the temperature of this gas is below that of the liquid in the heat sink.

Figure 2:
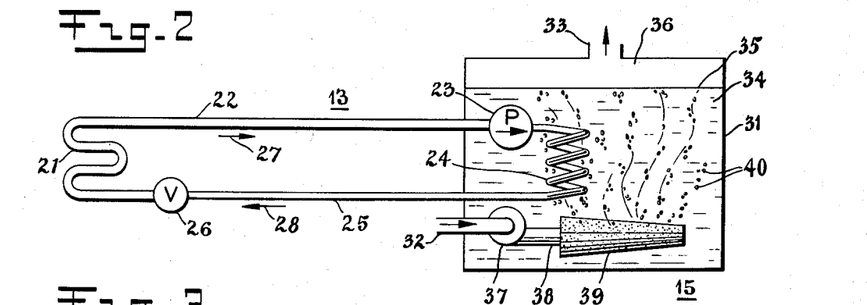
Fig. 2 shows largely schematically one form of a cooling system according to the invention.

Referring to Fig. 2, the basic components of one form of cooling system as in Fig. 1 are illustrated schematically. The compression-expansion type refrigerating system is illustrated by the cooling coil 21 and tubing 22 connecting with the compressor pump 23 which compresses the contained fluid refrigerant, and the warm coil or condenser 24 which cools and ordinarily liquifies the refrigerant, and the tubing 25 returning the compressed liquified refrigerant to the expansion valve 26 where the refrigerant returns to the gas state and expands in the coil 21 in extracting heat from the heat source, corresponding to block 11 of Fig. 1 but not shown in Fig. 2.

Thus the cooling coil 21 may surround or otherwise be arranged in heat exchange relation to the electronic equipment or other heat generating apparatus, the refrigerant passing through the coils, extracting heat and proceeding through the familiar compression-liquefaction-expansion cycle in the direction of the arrows 27, 28. The compression phase of the cycle adds the heat $H2$, which is the heat equivalent of the work on the refrigerant performed by the compressor, and the sum of the heats $H1$ and $H2$ must be extracted from the condenser coil 24 and disposed of by the heat sink 15, in which the coil 24 is placed.

The heat sink 15 is illustrated schematically at the right side of Fig. 2 by the tank 31 with gas inlet 32 and vapor and gas discharge outlet 33.

The tank 31 contains the liquid 34, which in the preferred form is water for example, and which only partially fills the tank, the line 35 indicating the liquid-vapor surface, and the zone 36 indicating the vapor and gas mixture above the liquid surface.

The gas (block 16 in Fig. 1) is introduced into the liquid-vapor system in the tank 31 of the heat sink 15 in Fig. 2 from the inlet 32, preferably by a blower 37 which feeds the gas at a slight pressure via tube 38 to the diffuser 39. The diffuser introduces the gas into the liquid in the form of very small bubbles 40 from numerous holes in its porous surface. The gas is preferably introduced well under the surface of the liquid 34 as shown for example.

The gas, which is air in the preferred form of the invention for airborne craft, becomes saturated as it picks up vapor in its intimate contact in small bubble form with the liquid 34, and breaks through the surface 35 in substantially saturated form, thus extracting heat from the system from the consequent vaporization of the liquid 34. Then the mixture of inert gas and saturated vapor 36 is exhausted at outlet 33, carrying out the total heat extracted from the system. The arrows at inlet 32 and outlet 33 indicate this flow in the heat sink.

In the preferred basic form illustrated in Fig. 2 the compressor 23 of the closed cycle refrigerating system 13 is immersed in the liquid 34, as is also the blower 37, as well as the warm coil 24 of the system 13, so that the additional heat $H2$ generated by the compressor and additional heat generated by the blower will also be absorbed in additional vaporization of the liquid 34. It will be appreciated that the motors for operating the compressor 23 and the blower 37 are assumed to be included in the schematic illustration although not separately indicated.

It will be apparent in view of the teachings of the invention however that these motors, or the motor and compressor unit and motor and blower unit, could alternatively with somewhat less efficiency be mounted on or partly or wholly outside the wall of the tank 31 and jacketed or otherwise arranged in heat exchange relation to one of the heat transfer or heat dissipating fluids of the system, as for example by conducting some of the liquid 34 into heat exchange relation to these components.

Figure 3:
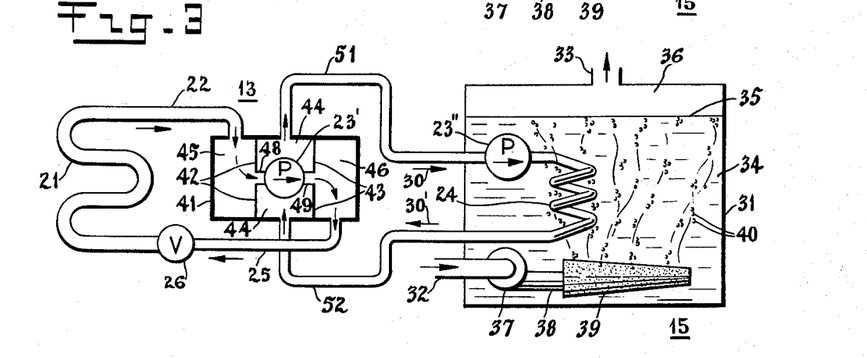
Fig. 3 shows a largely schematic diagram of another form of a cooling system employing the features of the invention.

Fig. 3 shows schematically another form of cooling system according to the invention, where it is desired to locate the compressor of the refrigerating cycle at a distance from the heat sink 15, or to transfer the heat from the refrigerating system to the heat sink through an intermediate heat exchanger, providing an intermediate temperature level if desired for example between the cold coil 21 of the refrigerating cycle and the heat transfer coil 24 in the heat sink.

Thus in Fig. 3 the compressor 23' corresponds to the compressor 23 of Fig. 2, but is immersed in or jacketed with an intermediate heat exchange fluid in chamber 44 of a heat exchanger 41, this intermediate fluid being circulated through chamber 44 and coil 24 by the circulating pump 23'' via the connecting tubing 51, 52 as indicated by the arrows 30, 30' for example. This intermediate heat exchanger 41 has the outer chambers 45, 46 separated in heat exchange relation by partitions 42 and 43 from the inner chambers 44.

The tubes 48 and 49 connect the chambers 45 and 46 via the compressor 23', the fluid refrigerant of the refrigerating cycle expanding and extracting heat in the cold coil 21 and passing in its heated vapor phase through tube 22 and chamber 45 and tube 48 of the heat exchanger 41 to the compressor 23', where the refrigerant is compressed and passed via tube 49 to chamber 46, meanwhile being cooled through the partition 42—43 by the circulating fluid in the chamber 44, the latter fluid also cooling the compressor 23'.

The refrigerant having now been condensed and cooled to liquid form, it is returned via tube 25 to expansion valve 26 to return to vapor form in the cooling coil 21 to complete the cycle.

Parts having identical reference numbers in Figs. 2 and 3 are corresponding parts.

It will be understood that the two parts, upper and lower, of chamber 44 in Fig. 3 are connected to permit fluid flow between them.

It will be appreciated that the circulating pump 23'' in Fig. 3 could alternatively be placed in the heat exchanger 41 instead of within the tank 31 of the heat sink as shown. Thus the pump 23'' could be placed within the chamber 44 of the heat changer 41, immersed or surrounded by or otherwise in heat exchange relation to the heat transfer fluid circulated through this chamber and tubes 51, 52 and the warm coil 24, the latter remaining in the tank 31, and the pump 23'' retaining its function of circulating the fluid through chamber 44 and coil 24 and the connecting tubing.

Figure 4:
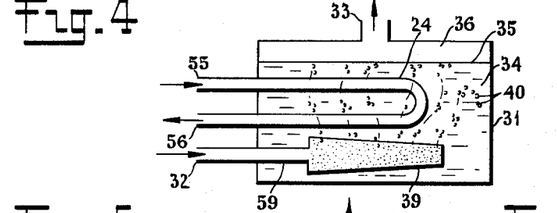
Fig. 4 shows a schematic diagram of a basic form of a heat sink as one aspect of the invention.

Fig. 4 illustrates schematically the basic features of the improved heat sink of the invention in simplified form. The heat sink includes the tank or container 31, with gas inlet 32, vapor and gas outlet 33, liquid 34, and vapor and gas zone 36 shown above the surface 35 of the liquid 34. The gas, which is air in the preferred form, is inducted from inlet 32 via tube 58 to the diffuser 39, which inducts the gas into the liquid 34 in the form of very small bubbles from numerous small holes in the diffuser. The diffuser 39 may be of sintered powdered metal and plastic or other binder which may be melted or burned out of the mixture leaving the metal in porous form for example, although the diffuser might alternatively be made of porous ceramic material or the like.

The heat exchange element 24 is illustrated schematically as a tube or coil for conducting a heat exchange fluid between its inlet 55 and outlet 56 as indicated by the associated arrows, the fluid within the element 24 being in heat exchange relation with but not in direct contact with the liquid 34. This fluid is the carrier of the heat to be dissipated into the heat sink.

It will be appreciated that the heat input element 24 is shown in half-loop or U-shape form for simplicity of illustration in Fig. 4, and that both this element and the diffuser 39 may have fan shape, plate shape or hollow cylinder or polygonal shape or various other shapes or forms suitable to their functions in place of the coil shape, and in some instances the heat sink of Fig. 4 might employ a solid metallic direct conductor of heat in rod, or sheet form or partly enlarged form without contained fluid where the latter was not needed for carrying the heat to be disposed of into the heat sink, as might be the case in specialized close coupled connection with the heat source to be cooled.

In any case the element 24 and any connecting tubing or conducting member from inlet 55 to outlet 56 is preferably of good heat conducting material, such as aluminum, copper, or silver for example, a light weight metal such as aluminum being of particular advantage in airborne applications.

The air or other inert gas may be inducted into the diffuser 39 and thence into the liquid 34 by means of a blower (not shown in Fig. 4), or by ram effect when used in a craft travelling through the air at any substantial speed.

The gas introduced through diffuser 39 becomes substantially saturated by vaporization of the liquid 34 in passing through the latter, and the resulting mixture of gas and vapor is exhausted at outlet 33. Such vaporization of liquid absorbs heat from element 24, which has conducted the heat into the heat sink from any desired external source (not shown in Fig. 4), preferably by means of tubing connected with the inlet 55 and outlet 56 and carrying any suitable heat transfer fluid from the external source.

It will be understood that the heat sink of Fig. 4, although of particular value in the cooling systems of Figs. 1–3 for example, may also have broader independent applications.

Figure 5:
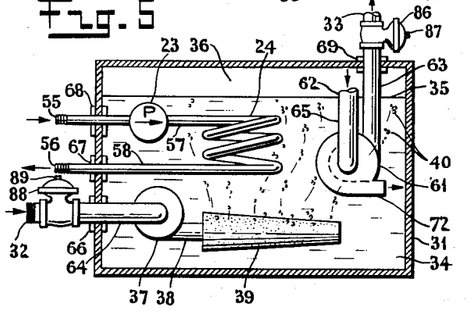
Fig. 5 shows a partly sectional side view of an improved heat sink illustrating further features.
Figure 6:
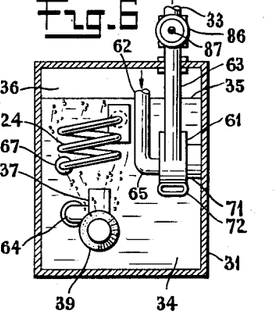
Fig. 6 shows a partly sectional end view of the same heat sink as in Fig. 5.

Referring now to Figs. 5 and 6 a preferred form of the heat sink according to one aspect of the invention is illustrated in more detail, Fig. 5 showing a vertical side view and Fig. 6 showing a vertical end view, with the walls of the tank 31 shown in section to enable the enclosed elements to be seen.

In Figs. 5 and 6 the heat exchange element 24 is shown in the form of a helical coil connected via tubing 57 and 58 to the pump 23 and outlet 56 respectively. The pump 23 may be a compressor pump as in Fig. 2 or a circulating pump as in Fig. 3, causing a heat exchange fluid to flow from inlet 55 through the pump and coil 24 and returned in cooled, or cooled and condensed form to outlet 56.

The tank 31, the gas and vapor outlet 33, gas inlet 32, blower 37, and diffuser 39 and connecting tube 38 correspond with the similarly numbered elements of Figs. 2 and 3, as also the liquid 34, gas and vapor zone 36 and surface 35, and gas and vapor bubbles 40.

The operation of the heat sink of Figs. 5 and 6 is essentially the same as described above in connection with Figs. 1, 2 and 3, as well as Fig. 4, with the heat extracted from the fluid in coil 24 being absorbed by the vaporization of liquid 34 in contact with the bubbles 40, and disposed of in the exhaust of gas and vapor, with the addition of a centrifugal separator 61 and valve 86 to control the exhaust from outlet 32, and with the inlet control valve 88. The added heat from pump 23 and blower 37 and from any further heat generated by friction or other losses in the heat sink are also disposed of similarly by evaporation of more liquid 34.

The centrifugal separator 61 is provided for conservation of liquid 34 in applications where vibration, some shift in position or acceleration or deceleration or some moderate tilting of the heat sink may be expected from the horizontal position shown, although a nearly horizontal or upright position may be assumed. This separator takes in the gas and vapor mixture from zone 36 and any liquid 34 which may also reach over the top of the inlet 62 of tube 65 by splashing or otherwise, and separates the gas-vapor mixture from the liquid in the well known manner, discharging the gas and vapor outside the heat sink at outlet 33 via tube 63 and discharging the liquid inside at outlet 72, preferably located well under the liquid surface as illustrated for example. The separator 61 and associated tubing may be supported from one of the walls of the tank 31, as by support member 71 for example.

The various tubes extending through the walls of the tank 31, or otherwise connecting with the outside, are provided with bushings or gland nuts or tubing connectors, for sealing the passage of the tubing through the walls or for sealed connection of outside tubing to source of gas and to heat source or cold coil of refrigerating system, not shown in Figs. 5, 6. This tubing inlet 55 has bushing 68, tubing outlet 56 has bushing 67, tubing 64 and inlet 32 have bushing 66 on the left wall in Fig. 5, and tubing 63 has bushing 69 on the top wall in Figs. 5–6. It will be understood that the tubing may be continuous with compression fittings or welding to seal around the tubing against loss of liquid 34 or gas-vapor or to maintain a pressure differential between inside and outside, or the fittings may provide a compression sealing arrangement for terminating the inner tubing at or within the wall, with extension of the fitting outside the wall for connection of other external tubing to the fittings, in any of the several ways well known in the art.

Figs. 5 and 6 also illustrate the provision of means for maintaining the internal pressure above a desired minimum level in the presence of lower ambient external pressure, as at high altitudes. Thus the valves 88 and 86 are illustrated on the gas inlet and gas-vapor outlet lines respectively. Valves of the diaphragm type are shown for illustrative purposes, but they may be alternatively of the bellows type or other suitable type for example, and in any case are arranged to be open to permit flow through the tubing at inlet and outlet when the internal pressure is above the desired minimum but closing to prevent such flow to maintain such minimum internal pressure. The valves 86 and 88 are shown with pressure adjusting screws 87 and 89 respectively. Valve 88 in the gas inlet preferably should operate at a slightly higher minimum pressure than valve 86 in the outlet since no added gas will be needed at this minimum pressure level to boil the liquid at a slightly elevated pressure and temperature and thus cause exhaust valve 86 to open.

The valve control of minimum internal pressure thus assures that the liquid 34 will not all boil away rapidly or suddenly at low external pressure under which the boiling point of the liquid may be below and possibly much below the normal operating temperature for heat dissipation in the heat sink.

As the external pressure falls from around sea level pressure in flight from sea level to high altitude for example, the internal pressure will also fall as long as these pressures remain above the desired minimum, as the valves will be open in such condition, and as the total internal pressure falls the temperature boiling point falls for such total pressure, and less gas is needed to add to the partial pressure of the saturated vapor in the liquid-vapor system in the heat sink to make up such lower total pressure.

As the total pressure continues to fall with altitude and approaches the saturated vapor pressure there is practically no gas needed to continue controlled vaporization of liquid 34 to dispose of the heat at about the same temperature as sea level operation with the initial substantially full amount of gas. Thus the gas intake valve can close and shut off the gas with only a slight rise in temperature to cause vaporization by boiling without added gas, and thus continue to carry off the heat by discharging only vapor. The gas intake valve can be designed to throttle the gas gradually to full closed position as the internal pressure falls as desired.

With further increase of altitude and further drop in pressure both inside and outside the heat sink tank the vapor-gas outlet valve will close at the minimum pressure level approximately but preferably slightly above the desired partial pressure of the saturated vapor at the desired operating temperature. As pointed out above the closing pressure level for this outlet valve is also preferably slightly lower than the closing pressure level of the intake valve. Thus with both intake and outlet valves closed as heat enters the liquid 34 from the coil 24 the temperature will start to rise slightly and the liquid will boil at this slightly higher temperature raising the internal pressure slightly and causing the valve 86 for outlet 33 to open sufficiently to bleed out exhaust vapor and maintain a nearly constant internal pressure at or slightly above the desired minimum, when the external pressure is below such minimum.

With the external pressure below the minimum and both inlet and outlet valves assumed closed at the moment for example, if it is now assumed that the external pressure rises from below such minimum to above such minimum the effect will be as follows. The heat supplied to the liquid from the coil 24 will cause some vaporization or boiling of the liquid, and as a result the internal pressure will rise slightly from the increased vapor pressure. This increase in pressure will open the exhaust valve slightly as soon as the internal pressure exceeds the minimum operating point for the valve, and thus as soon as the exhaust valve opens slightly the higher external pressure will be effective through the valve to raise the internal pressure to further open the valve, thus restoring the open valve condition normally prevailing when the internal and external pressure are both substantially above the minimum.

Under the conditions described if it is assumed as suggested above that the intake valve 88 is set for a slightly higher minimum pressure than the exhaust valve 86, the intake valve will open somewhat after the exhaust valve as the external pressure rises from minimum to substantially above the minimum.

Thus the inlet control valve 88 and the outlet control valve 86 may each serve as minimum pressure valves and throttle valves to reduce the rate of flow as the internal pressure falls approaching the minimum.

It will be appreciated that although these valves are illustrated as outside the tank 31 for convenience of adjustment and the like, they might be located partly or wholly within the tank if suitable access for adjustment is provided or if the valves may be set at the proper pressure control levels in advance in assembly of the heat sink.

Valve 88 on the gas inlet may alternatively be a check valve to prevent fluid from tank 31 from flowing out of inlet 32 in case the pressure within the tank is above the outside ambient pressure or above the pressure at the outside of the inlet, and the flow of gas into the tank could be controlled by a pressure switch or by other means not shown for control of the blower for example.

It will also be appreciated that the flow of gas into the tank is automatically controlled to a large degree by the characteristics of the blower in relation to the density of the gas. Thus where outside air is used as such gas and the density of the air falls with falling ambient pressure with increasing altitude less air will be supplied to the tank by the blower when less air is required for vaporizing the liquid because of the lower ambient pressure.

Thus as altitude increases the ambient pressure falls and less air intake will be required to add to the partial pressure of the saturated pressure to make up the total pressure. The effect of adding excess air if any will be to reduce the partial pressure of saturated vapor and thus reduce the operating temperature, the latter tending to fall to the lower temperature of saturated vapor at the lower partial pressure resulting from the additional air.

It will be understood that the blower 37 and the separator 61 incorporate motor means, as for example electric motors, and that the blower and separator might alternatively be closely coupled to be driven by a common motor for example.

Figure 7:
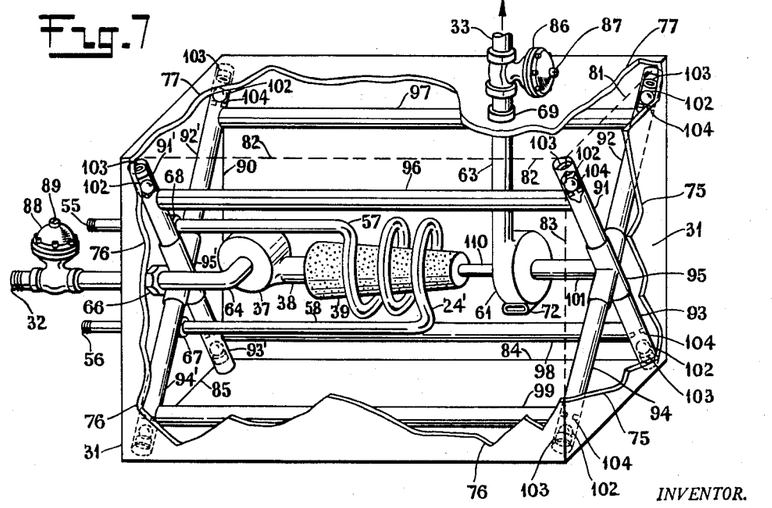
Fig. 7 shows a partly cutaway view of an improved form of a heat sink according to a further aspect of the invention and particularly adapted to operate in various altitudes as in an aircraft or missile in flight.

Referring now to Fig. 7, there is illustrated one preferred form of a heat sink of the general type set forth above, but particularly adapted for use in conditions where the heat sink may be subject to accelerative or decelerative forces and all attitudes, angles or positions with respect to the principal three dimensional axes in space, as in airborne craft in general, but particularly as in airborne missiles. It is understood that such airborne craft may not only tilt at any angle but may also rotate on any axis, but it is assumed that the rate of rotation will be sufficiently slow that any long sustained centrifugal forces will not be great enough to keep the contained liquid 34 entirely and continuously away from the central part of the tank 31 of the heat sink. Short period centrifugal, accelerative or decelerative forces may deflect the liquid past or away from the center of the tank briefly without materially diminishing the average disposal of heat, and the heat sink or system can be designed with some extra capacity to permit the temperature to rise slightly for short periods without damage or difficulty. In the form illustrated in Fig. 7 it is assumed that any rotation about any axis will be slow as explained above.

If rapid rotation of the craft and heat sink were apt to occur the coil 24 and diffuser 39 would preferably be arranged to cover a more extensive area in both horizontal and vertical directions so that a large part would always be immersed in liquid (not shown in Fig. 7) whether the vaporizing liquid were to be entirely at the bottom, top or one side of the tank or deflected by centrifugal force entirely toward the several such walls of the tank leaving the center only occupied by the vapor or vapor and gas mixture.

In event of such condition from rapid rotation an inlet port for vapor and gas, along with any liquid, would be provided in the member 110 which could also supply such mixture to the center of the centrifugal separator 61, for separation of liquid from the gas and vapor for example.

In Fig. 7 it will be noted that the several components such as heat input element or coil 24', diffuser 39, gas inlet 32 and vapor and gas outlet 33 associated with tank 31 are present, although in slightly different form from that illustrated in the Figs. 5–6 in some instances; and the general features of operation of the heat sink of Fig. 7 are the same as in Figs. 4–6. However, the vapor-gas exhaust system of Fig. 7 and the arrangement and construction of the several components are particularly adapted for airborne flight at various attitudes.

Thus it will be noted in Fig. 7 that the diffuser 39 is at or near the center of the tank 31 and has coil 24' encircling the diffuser but spaced from it, so that at whatever angle the heat sink is tilted the diffuser 39 and coil 24' will be substantially immersed in the contained liquid. For convenience of illustration the contained liquid to be vaporized, such as liquid 34 in Figs. 2–6, is not shown in Fig. 7, but it will be understood that such liquid will be provided in the tank 31 in the operation of the heat sink in Fig. 7 as in the other illustrations.

Several of the walls of the tank 31 are shown partly broken away merely to show the internal structure of the heat sink, the right wall at 75, the front wall at 76, and the top wall at 77. The broken lines 81, 82 and 83 represent the extensions of the edges joining the broken away walls, the line 81 between the top and right walls, the line 82 between the top and front walls and the line 83 between the right and front walls as viewed in Fig. 7.

The solid lines 84, 85 and 90 show the inside edges joining the bottom, left and rear walls; line 84 joining the rear and bottom walls, line 85 joining the left and bottom walls, and line 90 joining the left and rear walls.

The pump 23 of Figs. 5–6 is not shown in Fig. 7 for convenience of illustration of the remaining parts, but it will be understood that this pump may be included in the upper tubing 57 leading from inlet 55 to the coil 24' if it is desired to include this within the tank.

The valves 86 and 88 are shown connected with the vapor-gas outlet 33 and the gas inlet 32 respectively as in Figs. 5–6 for controlling intake of gas and exhaust of vapor and maintaining internal pressure above a desired minimum in the condition of lower external pressure.

The exhaust system in Fig. 7 employs a centrifugal separator 61 as in Figs. 5–6 with tube 63 for exhausting gas, vapor and heat through outlet 33 via the control valve 86, and for returning liquid within the tank at 72. On the intake side of the separator 61, the tube 101 connects to the several tubes 91, 92, 93 and 94 through the 5 way fitting 95, joining these tubes at right angles with respect to each other for example, adjacent the right wall as shown.

A similar set of tubes at right angles to each adjacent the left wall are illustrated at 91', 92', 93' and 94', joined at 95' and corresponding to those of similar numbers near the right wall. These two sets of tubes are connected by tubing 96, 97, 98 and 99 shown in substantially parallel arrangement for example, providing for the free flow of fluid such as vapor, gas and water mixture from any of the end tubes to the other and via the central intake tube 101 to the centrifugal separator 61.

These several interconnected tubes serve the dual purpose as shown, with individual valves at the tube ends, in the eight inside corners of the tank, to assure supplying vapor, with gas if present, and along with some liquid to the separator 61 to enable the vapor and gas to be exhausted to the outside and the liquid to be returned inside, despite the various attitudes of the heat sink. Thus whether the liquid is at the bottom or top or one or another end or corner for example, one or more ends of the several tubes will be outside the liquid and in a vapor-gas zone to pick up such vapor or vapor-gas mixture.

The valves in the ends of the several tubes are illustrated as of the simple ball and seat type with stops to retain the balls. These ball valves are shown in Fig. 7 by breaking away the walls of the tubes 91, 92 and 91' in part for example, the valves in the other tubes appearing in broken line form behind the walls, in Fig. 7. Thus these several ball valves have the ball 102, the seat 103 and the retaining stop 104 similarly identified throughout, except that for simplicity the reference characters have been omitted from the identical ball valves at the lower ends of tubes 93' and 94'.

These ball valves may be arranged with light coil springs between the ball and stop or may rely primarily on gravity to reduce intake of liquid by the separator via the several tubes so as to improve the effectiveness of vapor discharge and reduce the size of separator required.

The member 110 may serve as a spacer and support between the separator 61 and the diffuser 39, and it will be understood that spacing and support members may similarly be provided between the coil 24' and the diffuser 39 or between the coil and tubes 96–99 or otherwise for increased strength and rigidity to meet strong acceleration and deceleration forces for example, as needed, and for such purpose number 110 is preferably in the form of a tube for strength and minimum weight. Such tubing would be closed against any flow of gas directly from the diffuser 39 or tube 38 to the separator 61.

Although Fig. 7 illustrates in a pictorial manner one preferred form of heat sink especially adapted for various attitudes which may occur in airborne flight, it will be appreciated by those skilled in the art that other arrangements of the various cooperating parts or substitutions of other equivalent parts or the like might be made in view of the teachings of the invention and within the scope thereof, as by combining all four tubes 96–99 into one central tube passing through a hollow diffuser to connect the two end sets of tubes with the separator intake, with the gas feed to the latter via blower 37 and tube 38 offset to either or both sides of the center, for example.

Although the tank 31 is illustrated in straight wall rectangular form for simplicity in the several drawings, it will be understood that the walls may be reenforced or have a convex or cylindrical form for additional strength where a substantial pressure differential is to be maintained under conditions of low ambient external pressures, as at high altitudes.

In operation it will be understood that the heat sink tank will be charged with water or other suitable vaporizing liquid in preparation for flight, and would have sufficient capacity for the total heat to be dissipated during the flight, on the approximate basis of one pound of water to be vaporized for each 1000 B.t.u. of total heat, including losses of all kinds, to be dissipated for example, and with sufficient additional such liquid for reserve or factor of safety as well as sufficient to maintain substantial coverage of or contact with the coil or heat transfer element 24 or 24' throughout the period of required heat dissipation in connection with the flight. Thus in Figs. 2–6, the element 24 may surround or otherwise be placed in closer association with the diffuser 39 in the lower part of the tank or near the center of the tank as in the use of corresponding element 24' in Fig. 7 for example.

Where a liquid with high heat of vaporization, such as water, is used it will be obvious that a relatively small amount of such liquid will be needed for a trip or flight of substantial time length, in proportion to the rate of heat dissipation required, and that high speed aircraft and missiles will cover great distances in short periods of time.

It will also be understood that in some circumstances where air or other inert gas is available in the craft of sufficient pressure for use in the heat sink, such air or gas may be inducted into the heat sink at the gas inlet to replace or supplement outside air, and that where desirable a separate source or tank of compressed dry air or inert gas might be used and throttled into inlet 32 or otherwise bled into the liquid in tank 31, with some limited additional cooling effect from the expansion of such compressed air or gas.

Ordinarily such independent source or tank of compressed gas is not needed where air is used since at low altitudes where substantial quantity of air is needed to be inducted to obtain controlled vaporization below the normal boiling point for the prevailing relatively high ambient pressure there is adequate outside air available, and at high altitudes where outside air is limited because of low density, the accompanying low ambient pressure makes it possible to boil the vaporizable liquid without addition of air or other inert gas 16. At intermediate altitudes as less outside air becomes available with increasing altitude, less air is needed in the heat sink to vaporize the liquid because of the falling total ambient pressure and the consequent reduction in partial pressure of air to be added to the partial pressure of saturated vaopr at the same operating temperature to make up the reduced total pressure.

If ram air is inducted into the craft for use in the heat sink 15, such air will have its pressure and temperature elevated above the ambient conditions by the compression of the ram effect, and such air may be throttled as needed by valve action to limit the pressure differential over the internal pressure in the tank. In any event if air at temperatures above the operating temperature of the heat sink is inducted into the heat sink, additional liquid will be vaporized to dispose of this additional heat, the air being reduced substantially to the temperature of the liquid in passing through the latter in small bubble form, and the operating temperature of the heat sink not rising appreciably, due to the low specific heat of air in relation to the heat of vaporization of the liquid.

In the operation of the heat sink it will be understood by those skilled in the art that the operating temperature of the heat sink will be determined by the temperature of saturated vapor at the partial pressure for such vapor in accordance with the proportions of air or other inert gas and such vapor in connection with the liquid-vapor equilibrium and the vapor-gas mixture above the surface of the liquid in the tank, and the system will be designed to provide sufficient air to provide for an appropriate operating temperature level under the conditions where maximum air will be needed as at low altitudes approximating sea level conditions for example, preferably with some excess capacity for induction of gas and exhaust of gas and vapor, and to provide an appropriate temperature differential below the temperature of the fluid refrigerant in the coil or heat transfer element 24 in order to obtain effective heat transfer to the liquid 34 in contact with element 24. Using water as an example for liquid 34 the amount of liquid to be vaporized to dissipate the total heat $H1+H2+H3$ plus any additional losses $H4$ will be at the approximate rate of one pound of water for each 1,000 B.t.u. of such total heat to be dissipated.

Thus if an operating temperature of the heat sink of 161 degrees with air and water is assumed for purposes of illustration but without limitation thereto, this temperature corresponds with a saturated water vapor pressure of 254 mm., and the approximate proportions of dry air and water vapor in the output mixture of air and vapor would be ⅓ water vapor and ⅔ air with such partial pressure of 254 mm. for the vapor and the remainder of 506 mm. partial pressure of dry air to make up the total atmospheric pressure of 760 mm. under sea level conditions. The proportions mentioned are by volume referred to the same pressure base for both air and vapor.

To the extent that air is introduced with some water vapor content, somewhat more of such input mixture of dry air and water vapor will be required to supply the necessary dry air equivalent at the operating temperature, although the amount of such increase in air is very little for normal atmospheric conditions since the partial pressure and density of saturated vapor is much higher for an operating temperature of 161 degrees for example than for the lower atmospheric temperatures normally prevailing, and the weight of water vapor which can be carried by the air at the operating temperature is higher than at such lower atmospheric temperature for entering air. Thus considerably more water can be vaporized by reason of this rise in temperature as incoming moist air passes through the water and quickly reaches the assumed temperature of 161 degrees F. of the water in contrast to the much lower incoming temperature of the air.

It will be appreciated that under ordinary atmospheric conditions high ambient temperatures are ordinarily not accompanied by high humidity or water vapor content, and thus with an operating temperature of the order of that given as an illustration, the incoming air will be able to reduce the partial pressure of the vapor in the liquid-vapor equilibrium to that of saturated vapor and provide an exhaust of air and substantially saturated vapor at the operating temperature.

It will be observed that the introduction of air or other appropriate inert gas into the liquid-vapor equilibrium in the heat sink thus reduces the partial pressure of the vapor and enables vaporization to proceed on a controlled basis at a temperature below the normal boiling point corresponding to total ambient pressure. The consequent reduction in operating temperature of the heat sink enables the refrigerating system or cycle to operate at a lower temperature differential between input and output and therefore substantially increases its coefficient of performance.

Thus if operation at 161 degrees F. is assumed in comparison with 212 degrees F. as the normal boiling point of water at 760 mm. in operation of the heat sink with vaporization of water for example, and a ten degree temperature differential is assumed between the water and the heat output element 24 of the refrigerating system and the latter system is assumed to operate at input temperature of 120 degrees, the reduction of the temperature differential between input and output of the refrigerating system from 102 degrees F. to 51 degrees F. in accordance with the principles of the invention, could increase the theoretical coefficient of performance by something of the order of twofold or more as a rough approximation, for example, considering primarily the amount of useful heat transfer in relation to the net heat equivalent of work required in the refrigerating system to produce such transfer, neglecting losses, with a consequent reduction in horsepower of the order of 50% or more.

It will be understood that if humidity of air were a problem however, a different vaporizable liquid could be employed whose vapor is negligible or absent in atmospheric air, or some other inert gas could be separately supplied in part or wholly as required, in which the vapor of the liquid is negligible or absent.

Thus it will be noted that the heat sink in the cooling system in accordance with the invention is particularly well adapted to meet the wide range of conditions of temperature, pressure and air density found in flight through both the lower and upper atmosphere, as well as outside the atmosphere, and also to meet with various normal conditions of humidity that may be found in such flight.

A number of variations in construction have been described or illustrated, and other arrangements of value, pumps, blower and diffuser and intake and exhaust facilities might also be made, and various other modifications of these or other components or their arrangements may be made within the spirit of the invention and the scope of the appended claims, as will be obvious to those skilled in the art with the teachings of the invention in mind.

I claim:

1. A cooling system including an enclosed fluid, a cold element, a warm output element containing said fluid, a compressor for compressing fluid from the cold element and passing the compressed fluid to said warm output element, an expansion valve connected between said warm output element and said cold element to provide for expansion of the contained fluid into said cold element for cooling purposes, a tank containing a vaporizable liquid in heat extracting relation to said output element, said liquid having a normal boiling temperature above the temperature of said warm output element, and means for supplying an inert gas into contact with said liquid in the liquid-vapor equilibrium of said liquid and its vapor to reduce the partial pressure of the vapor for controlled vaporization of said liquid to extract heat from said warm output at a temperature below said warm output and below said normal boiling point, said gas supplying means including a diffusing element having numerous minute apertures for dispersing said gas in the form of numerous fine streams of bubbles in said liquid and means including a blower in heat exchange relation to said liquid for controlling the flow of gas to said diffusing element.

2. A cooling system including an enclosed fluid compression-expansion refrigerating system having a low temperature heat extracting element and a compressor connected to one side of said low temperature element to compress warmed fluid therefrom and an expansion valve connected between said compressor and the other side of said cold element to receive compressed fluid and expand the same into said cold element for cooling purposes, a heat exchanger containing one part through which said compressed fluid flows from said compressor toward said expansion valve and containing another part in heat exchange relation therewith including an independent fluid, means for circulating said independent fluid between said other part of said heat exchanger and a second output element for transferring heat form said compressed fluid to said second output element, a tank including a liquid in heat extracting relation to said second output element, said liquid having a normal boiling temperature above the temperature of said second output element, said compressor being in heat exchange relation with said independent fluid and said circulating means being in heat exchange relation with said liquid and means for supplying an inert gas in finely dispersed small bubble form into said liquid to reduce the partial pressure of the vapor in the liquid-vapor equilibrium for vaporization of said liquid to extract heat from said second output element at a temperature lower than the normal boiling point for an all saturated vapor-liquid equilibrium, and means for exhausting said vapor and gas from said tank to dispose of the extracted heat.

3. A cooling system including an enclosed fluid compression-expansion refrigerating system having a low temperature heat extracting end and a higher temperature head discharging output, a tank containing a vaporizable liquid in heat extracting relation to said output, means for supplying an inert gas into the liquid-vapor equilibrium of said liquid and its vapor to reduce the partial pressure of the vapor in said equilibrium for extracting heat from said output by vaporizing said liquid at a reduced temperature below the normal boiling temperature of said liquid in all vapor saturated equilibrium, and a centrifugal separator having an intake for said gas and vapor and any mixed liquid and having outlets for discharging liquid within said tank and gas and vapor outside said tank.

4. A cooling system as in claim 3 and including means for extracting said gas and vapor and any mixed liquid from numerous widely dispersed points within said tank and near the walls thereof for supplying such mixture to said separator, whereby exhaust of vapor and any gas will proceed despite the assumption of various attitudes in relation to the three principal dimensional axes by said tank.

5. A cooling system for atmospheric conditions at low and high altitudes including a compression-expansion refrigerating apparatus having cold and warm output ends, a container of liquid in heat extracting relation to said warm output, said liquid having a normal boiling temperature at sea level atmospheric pressure considerably above the temperature of said warm output and having a boiling point at the reduced ambient pressures outside the lower atmosphere below said temperature of said warm output, means for introducing an inert gas into intimate contact with said liquid in said container to cause controlled vaporization of said liquid to so extract such heat at a temperature below said temperature of the warm output and considerably below said normal boiling temperature under normal ambient pressure conditions in the lower atmosphere by reducing the partial vapor pressure under the latter conditions to a level of the order of reduced ambient pressure outside the lower atmosphere, whereby the temperature of heat extraction from said warm output is lowered to obtain an improved coefficient of performance of said refrigerating apparatus, means for exhausting said vapor and any of such accompanying gas from said container to dispose of such extracted heat, and means for maintaining the pressure in said container above a minimum level of the order of said reduced partial vapor pressure level when external ambient pressure is below such latter level.

6. In a cooling system for airborne craft subject to widely varying conditions of ambient temperature, pressure and density at low and high altitudes in and outside the lower atmosphere and containing heat generating apparatus to be maintained below a critical temperature, an enclosed fluid expansion-compression refrigerating system having a low temperature element in heat exchange relation to such apparatus to extract heat therefrom below such critical temperature and having a higher temperature output element from which such heat and the heat of compression are to be extracted, a liquid in heat exchange relation to said output element and having a high heat of vaporization at temperatures approximating that of said output element, means for introducing an inert gas into said liquid to reduce the vapor pressure in contact with said liquid and to cause controlled vaporization of said liquid below the temperature of said output element and below the normal boiling point of said liquid at atmospheric pressures of the lower atmosphere to extract heat from said output element, means for exhausting the gas and vapor mixture to dispose of the heat extracted from said output element, and means for maintaining a minimum pressure on said liquid to permit controlled vaporization but to prevent uncontrolled boiling of the liquid when the external atmospheric pressure falls below such minimum.

7. In a cooling system for airborne craft subject to widely varying ambient conditions of temperature, pressure and density in the lower atmosphere and at high altitudes outside the lower atmosphere, and containing heat generating apparatus to be maintained below a critical temperature, an enclosed fluid expansion-compression refrigerating system having a low temperature element in heat exchange relation to such apparatus to extract heat therefrom below such critical temperature and having a higher temperature output element from which such heat and the heat of compression are to be extracted, a liquid in heat exchange relation to said output element and having a high heat of vaporization at temperatures approximating that of said output element and a normal boiling temperature considerably above the temperature of said output element at ambient pressures of the lower atmosphere but having a boiling temperature below said temperature of said output element at the reduced ambient pressure outside of the lower atmosphere, means for introducing air into said liquid at a rate varying with the ambient pressure in the lower atmosphere to reduce the partial pressure of vapor in contact with said liquid to correspond with the reduced ambient pressure outside of the lower atmosphere to cause controlled vaporization of said liquid below the temperature of said output element and approximating the boiling temperature of said liquid at such reduced ambient pressure outside the lower atmosphere, means for containing said liquid in such heat exchange relation and for exhausting the air and vapor mixture to the outside atmosphere to dispose of the heat extracted from said output element, and means for maintaining the pressure in said containing means above a minimum level of the order of said reduced vapor pressure level at high altitudes when external ambient pressure is below such latter level to prevent uncontrolled boiling of said liquid but to permit continued controlled vaporization of liquid by continued extraction of heat substantially without air at such high altitudes.

8. In a cooling system for airborne craft subject to widely varying ambient conditions of temperature, pressure and density in the lower atmosphere and at high altitudes outside the lower atmosphere, and having a part of such craft to be maintained below a critical temperature, an enclosed fluid expansion-compression refrigerating system having a low temperature element for heat exchange relation to such part of said craft to extract heat therefrom below such critical temperature and having a higher temperature output element from which such heat and the heat of compression are to be extracted, a tank containing a liquid in heat extracting relation to said warm output and having a normal boiling temperature above that of the said output, means for introducing an inert gas into the liquid-vapor equilibrim of said liquid and its vapor to reduce the partial pressure of said vapor in relation to the total ambient pressure to extract heat from said output at a temperature below the temperature of the latter and below said normal boiling point to lower the temperature of heat extraction from said output element whereby the coefficient of performance of said refrigerating system is improved, and means for maintaining pressure within said tank above a desired minimum in the event of ambient external pressure falling below said minimum.

9. In a cooling system for airborne craft subject to widely varying ambient conditions of temperature, pressure and density in the lower atmosphere and at high altitudes outside the lower atmosphere, and having a part of such craft to be maintained below a critical temperature, an enclosed fluid expansion-compression refrigerating system having a low temperature element for heat exchange relation to such part of said craft to extract heat therefrom below such critical temperature and having a higher temperature output element from which such heat and the heat of compression are to be extracted, a tank containing a liquid in heat extracting relation to said warm output and having a normal boiling temperature above that of the said output, means for introducing an inert gas into the liquid-vapor equilibrium of said liquid and its vapor to reduce the partial pressure of said vapor in relation to the total ambient pressure to extract heat from said output at a temperature below the temperature of the latter and below said normal boiling point to lower the temperature of heat extraction from said output element whereby the coefficient of performance of said refrigerating system is improved, and means including a separator for taking in vapor and any gas and liquid mixed therewith in said tank and for exhausting vapor and any gas mixed therewith to the outside atmosphere and for returning any liquid mixed therewith inside of said tank.

10. A combination as in claim 9 and in which said warm output and said gas supply means are substantially centered within said tank, and in which the vapor intake means for the separator is provided at widely spaced points around the periphery in all directions inside the tank for taking in vapor and any gas or liquid mixed therewith to feed such mixture to said separator to enable the exhaust of vapor despite assumption of various attitudes by the tank in relation to the three principal dimensional axes.

11. A cooling system as in claim 5 and including means for reducing the supply of said inert gas as the ambient pressure falls.

12. A cooling system as in claim 5 in which said inert gas is air.

13. A cooling system as in claim 5 in which said inert gas is air and said liquid is water.

14. In a cooling system incorporating a compressor-condenser-evaporator cycle, a container of vaporizable liquid in heat extracting relation to said condenser, means including a blower for introducing an inert gas into contact with said liquid in said container to cause controlled vaporization of said liquid to so extract such heat at a temperature below the normal boiling point thereof at the total ambient pressure, to lower the temperature of heat extraction from said condenser whereby the coefficient of performance of said refrigerating cycle is improved, and means for exhausting gas and vapor from said container to dispose of such extracted heat, said liquid being in heat exchange relation also to said compressor and said blower to cool the latter elements by additional vaporization of liquid.

15. A cooling system including a container, a liquid in said container and providing a local atmosphere containing vapor of the liquid therein, a heat transfer element in contact with said liquid and from which it is desired to extract heat, means for supplying a gas in a controlled flow in the form of numerous fine bubbles through said liquid in said container for reducing the vapor pressure in relation to total pressure on said liquid for extracting such heat by vaporizing said liquid at a temperature below the boiling point of said liquid for its all vapor saturated atmosphere, outlet means for exhausting such vapor and gas from said container, and means for maintaining pressure within said container above a desired minimum in the event of ambient pressure outside said container falling below said minimum.

16. A cooling system including a container, a liquid in said container and providing a local atmosphere containing vapor of the liquid therein, a heat transfer element in contact with said liquid and from which it is desired to extract heat, means for supplying a gas in a controlled flow in the form of numerous fine bubbles through said liquid in said container for reducing the vapor pressure in relation to total pressure on said liquid for extracting such heat by vaporizing said liquid at a temperature below the boiling point of said liquid for its all vapor saturated atmosphere, outlet means for exhausting such vapor and gas from said container, and means for taking in vapor and any gas and liquid mixed therewith within said container and separating and discharging said liquid within said container and discharging vapor and any gas mixed therewith to said outlet means.

17. A cooling system as in claim 16, and in which the vapor intake means for the separator is provided at widely spaced points around the periphery in all directions inside the container for taking in vapor and any gas or liquid mixed therewith to feed such mixture to said separator to enable the exhaust of vapor and any gas therewith despite assumption of various positional attitudes by the container in relation to the several directions.

18. In a cooling system for extracting heat by vaporizing a liquid, a tank for enclosing such liquid, a heat conducting element extending within said tank and from which it is desired to extract heat supplied from outside said tank, said heat conducting element being arranged for contact with such liquid, means including an inlet and a blower and diffuser for supplying gas in dispersed finely divided streams into said tank for introducing said gas within said liquid, an outlet for the escape of vapor and any gas mixed therewith, and valve means for controlling the inlet of gas and outlet of vapor and any gas mixed therewith for maintaining pressure within said tank above a desired minimum in the event of ambient pressure outside said tank falling below said minimum.

19. A method for maintaining the temperature of a heat dispersing element at a desired relatively low point while extracting and disposing of the heat therefrom under widely varying ambient conditions of temperature and pressure in the atmosphere, comprising placing in heat exchange relation to said element a body of vaporizable liquid having a normal boiling temperature above that of said element, producing a controlled forced flow of inert gas in fine bubbles through the liquid to extract the heat from said element by controlled vaporization of said liquid below the temperature of said element and having the effect of controlled boiling at desired sub-normal temperature, and providing a controlled discharge of such gas and vapor from said liquid to the atmosphere to dispose of such heat while maintaining a controlled pressure above a desired minimum on said liquid and vapor despite any lower ambient pressure in the atmosphere.

References Cited in the file of this patent

UNITED STATES PATENTS

| | | |
|---|---|---|
| 313,047 | Becker | Mar. 3, 1885 |
| 634,583 | Morris | Oct. 10, 1899 |
| 1,933,703 | Brus | Nov. 7, 1933 |
| 2,068,478 | Bergdoll | Jan. 19, 1937 |
| 2,221,530 | Strang | Nov. 12, 1940 |
| 2,777,677 | Bunch | Jan. 15, 1957 |